UNITED STATES PATENT OFFICE.

CARL DIETZ, OF EHMEN, NEAR FALLERSLEBEN, GERMANY, ASSIGNOR, BY MESNE ASSIGNMENTS, TO THE CHEMICAL FOUNDATION, INC., A CORPORATION OF DELAWARE.

MANUFACTURE OF TABLE-SALT.

1,362,087.  Specification of Letters Patent.  Patented Dec. 14, 1920.

No Drawing.   Application filed November 14, 1916. Serial No. 131,222.

*To all whom it may concern:*

Be it known that I, CARL DIETZ, chief director, subject of the King of Prussia, Emperor of Germany, residing at Ehmen, near Fallersleben, Germany, have invented certain new and useful Improvements in the Manufacture of Table-Salt, of which the following is a specification.

My invention relates to the manufacture of a table salt capable of being readily sprinkled or scattered, and it is the object of my invention to provide a novel process of converting rock salt into a readily sprinkled table salt.

Hitherto, it has been proposed to manufacture table salt which is non-hygroscopic, or but slightly hygroscopic, by admixing with the solid salt sodium carbonates or sodium phosphates in the solid or liquid state, with a view to cause a chemical conversion of the very hygroscopic calcium chlorid and magnesium chlorid contained in the salt, into less hygroscopic salts. However, the chemical decomposition which this procedure involves affects the individual granules of the salt as regards their firmness and cohesion, this being due to the fact that a portion of their constituents become dissolved; as a natural consequence, the value of the thus treated salt is diminished.

In attaining the object of my present invention I likewise effect a reduction of the hygroscopic property of the salt; however, the structure of the granules of the salt is not affected thereby. In carrying my invention into effect I employ a solution which is chemically inert toward rock salt. With that object in view I employ sodium chlorid, preferably in a pure state, as the solute. I prefer to prepare a saturated solution of sodium chlorid with which the rock salt to be converted into a valuable table salt, is moistened after having been disintegrated to an appropriate degree. The thus moistened substances are then subjected to a commingling and drying treatment, after which treatment the surfaces of the granules of the rock salt will be found to be coated with a thin layer of sodium chlorid, which coating acts to protect the individual granules against the influence of moisture since the sodium chlorid forming the protective coating is non-hygroscopic in contradistinction to the chlorids of calcium and magnesium as contained in the rock salt. Owing to the protective action of the coating of sodium chlorid, the thus treated salt remains dry and maintains its capability of being readily sprinkled or scattered.

It has been proposed previously, to spray water over the surfaces of rock salt crystals in order to cause a dissolution upon the said surfaces; this measure, however, results in the production upon said surfaces of a layer consisting of the chlorids of calcium and magnesium and which layer is hygroscopic, whereas it is the object of my invention to envelop the salt in a non-hygroscopic coating, which as I have discovered may be composed of sodium chlorid.

What I claim as my invention and desire to secure by Letters Patent of the United States is:—

1. The hereinbefore described table salt, the granules of which consist of a nucleus of rock salt and a coating of sodium chlorid enveloping said nucleus.

2. The hereinbefore described table salt, comprising granules each of which consists of a nucleus of rock salt and a non-hygroscopic coating composed of sodium chlorid, said coating acting to protect the said nucleus of rock salt against the influence of moisture.

3. The hereinbefore described process of manufacturing table salt, consisting in moistening rock salt with a saturated solution of sodium chlorid, and drying the thus moistened salt.

4. The hereinbefore described process of manufacturing table salt, consisting in moistening rock salt with a solution of pure sodium chlorid, and drying the thus moistened salt.

5. The hereinbefore described process of manufacturing table salt, consisting in moistening rock salt with a saturated solution of pure sodium chlorid, and drying the thus moistened salt.

6. The hereinbefore described process of manufacturing table salt, consisting in disintegrating rock salt to the grain size of table salt, moistening the disintegrated mass with a solution of sodium chlorid, and commingling and drying the resulting product to a readily sprinkable table salt.

In testimony whereof I have hereunto set my hand in presence of two subscribing witnesses.

CARL DIETZ.

Witnesses:
 WILHELM LEHRKE,
 Dr. PAUL BOCK.